United States Patent
Ernstson et al.

(10) Patent No.: US 11,255,420 B2
(45) Date of Patent: Feb. 22, 2022

(54) WORM GEAR FOR A WORM GEAR SYSTEM IN A MOTOR VEHICLE STEERING DEVICE HAVING AN INJECTION-MOULDED SUPPORT RING

(71) Applicants: thyssenkrupp Presta AG, Eschen (LI); thyssenkrupp AG, Essen (DE)

(72) Inventors: Gernot Ernstson, Feldkirch (AT); Manuel Peter, Hinwil (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 2 days.

(21) Appl. No.: 16/769,317

(22) PCT Filed: Dec. 18, 2018

(86) PCT No.: PCT/EP2018/085647
§ 371 (c)(1),
(2) Date: Jun. 3, 2020

(87) PCT Pub. No.: WO2019/121781
PCT Pub. Date: Jun. 27, 2019

(65) Prior Publication Data
US 2020/0325975 A1    Oct. 15, 2020

(30) Foreign Application Priority Data
Dec. 22, 2017  (DE) .............. 10 2017 131 180.7

(51) Int. Cl.
*F16H 55/06* (2006.01)
*B29C 45/14* (2006.01)
(Continued)

(52) U.S. Cl.
CPC ....... *F16H 55/06* (2013.01); *B29C 45/14491* (2013.01); *B62D 5/0421* (2013.01);
(Continued)

(58) Field of Classification Search
CPC .............. F16H 2055/065; F16H 55/06; B29C 45/14491; B29L 2015/003
See application file for complete search history.

(56) References Cited

U.S. PATENT DOCUMENTS

2007/0089555 A1   4/2007  Tomoda
2013/0228028 A1*  9/2013  Kim .................... B62D 5/0409
                                                        74/434
(Continued)

FOREIGN PATENT DOCUMENTS

DE           667 565 A    11/1938
DE       103 26 819 A    12/2004
(Continued)

OTHER PUBLICATIONS

English Translation of International Search Report issued in PCT/EP2018/085647, dated Mar. 7, 2019.

*Primary Examiner* — Terence Boes
(74) *Attorney, Agent, or Firm* — thyssenkrupp North America, LLC

(57) ABSTRACT

A worm gear for a worm gear system of a motor vehicle steering device may include a hub, a support element, and a gear rim. The support element may be a support ring that by means of an injection-molding method is injected between the gear rim and the hub. The support ring may connect in a form-fitting manner the hub and the gear rim. The gear rim and the support element may configure a multiplicity of teeth. The support element may have support webs that penetrate the gear rim such that radially outward pointing end sides of the support webs are exposed.

17 Claims, 3 Drawing Sheets

(51) Int. Cl.
 *F16H 1/16* (2006.01)
 *F16H 55/22* (2006.01)
 *B29L 15/00* (2006.01)
 *B62D 5/04* (2006.01)
 *B29L 31/30* (2006.01)

(52) U.S. Cl.
 CPC .............. *F16H 1/16* (2013.01); *F16H 55/22* (2013.01); *B29C 2045/1454* (2013.01); *B29L 2015/003* (2013.01); *B29L 2031/30* (2013.01); *F16H 2055/065* (2013.01)

(56) References Cited

U.S. PATENT DOCUMENTS

| | | | | |
|---|---|---|---|---|
| 2015/0308555 | A1* | 10/2015 | Oberle | F16H 55/17 74/421 R |
| 2016/0017976 | A1* | 1/2016 | Iijima | B29C 45/1459 74/446 |
| 2017/0166239 | A1* | 6/2017 | Kim | B62D 5/008 |

FOREIGN PATENT DOCUMENTS

| | | | | |
|---|---|---|---|---|
| DE | 10 2012 102 776 A | | 10/2013 | |
| DE | 10 2014 104 284 A | | 10/2015 | |
| DE | 10 2014 104 949 A | | 10/2015 | |
| DE | 10 2016 223 877 A | | 6/2017 | |
| EP | 1 777 439 A | | 4/2007 | |
| WO | 2015/144412 A | | 10/2015 | |
| WO | 2015/154920 A | | 10/2015 | |
| WO | WO-2015144413 A1 * | | 10/2015 | ............. F16H 55/06 |

* cited by examiner

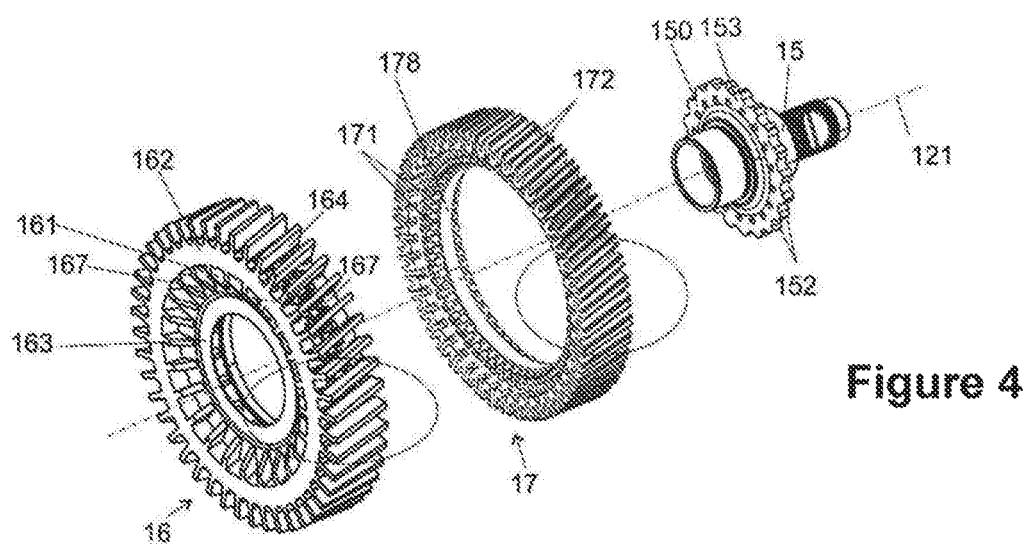
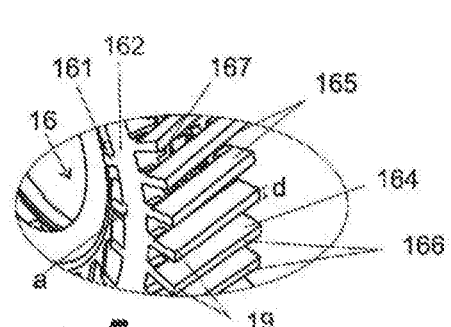
Figure 5
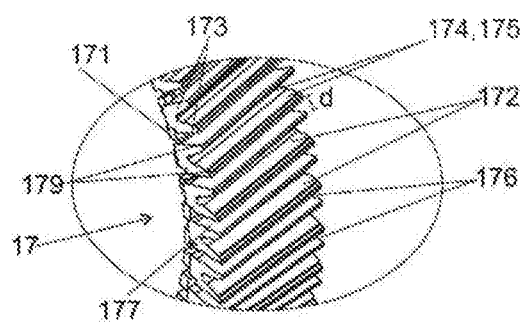
Figure 6
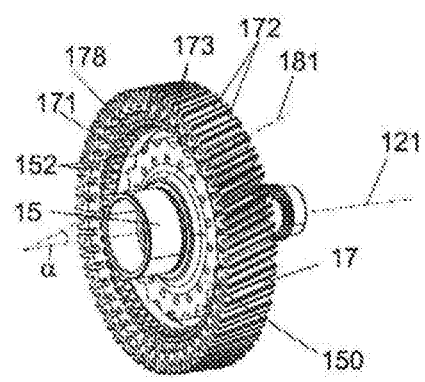
Figure 7
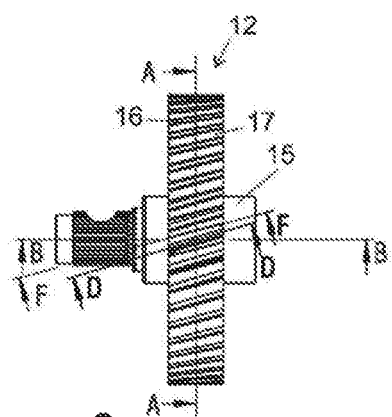
Figure 8

WORM GEAR FOR A WORM GEAR SYSTEM IN A MOTOR VEHICLE STEERING DEVICE HAVING AN INJECTION-MOULDED SUPPORT RING

CROSS REFERENCE TO RELATED APPLICATIONS

This application is a U.S. National Stage Entry of International Patent Application Serial Number PCT/EP2018/085647, filed Dec. 18, 2018, which claims priority to German Patent Application No. DE 10 2017 131 180.7, filed Dec. 22, 2017, the entire contents of both of which are incorporated herein by reference.

FIELD

The present disclosure generally relates to steering systems, including worm gears and worm gear systems of motor vehicle steering devices.

BACKGROUND

Gear systems which transmit an auxiliary torque from an electric motor to a steering shaft are inter aha required in the use of electro-mechanical power-assisted steering devices. The electric motor usually drives a worm which engages with a worm gear which is disposed in a rotationally fixed manner on the steering shaft or on a pinion.

The worm gear comprises an insert which is connectable in a rotationally fixed manner to the steering shaft or to the pinion, wherein said insert is enhanced with a plastics material. Said plastics material configures the so-called gear rim.

Worm gear systems are exposed to shock-type stress on account of which the forces generated by the maximum torque on the tooth flanks in normal operation lead to excessive stress. The tooth flanks are in particular highly sensitive to said shock-type stress.

A multiple-part gear wheel in which a connection part connects a hub to a gear rim is known from the first and unexamined publication DE 10 2014 104 284 A1. The connection part herein encloses the gear rim toothing in portions in the region of the end face.

This solution has proven disadvantageous in that a non-uniform distribution of force is created in the region of the engagement between the worm and the worm gear, on account of which more rapid abrasion of the worm gear system and thus more rapid wear is facilitated.

Thus a need exists for a worm gear for a worm gear system of a motor vehicle steering device which by way of ideally simple means enables an improved distribution of force in the engagement between the worm and the worm gear, thus enabling the transmission of higher torques.

BRIEF DESCRIPTION OF THE FIGURES

FIG. 4 is an exploded view of the worm gear.

FIG. 5 is a detail view of an example support ring of the worm gear.

FIG. 6 is a detail view of an example gear rim of the worm gear.

FIG. 7 is a spatial view of the worm gear without the support ring.

FIG. 8 is a top view of the example worm gear.

DETAILED DESCRIPTION

Figure 1:
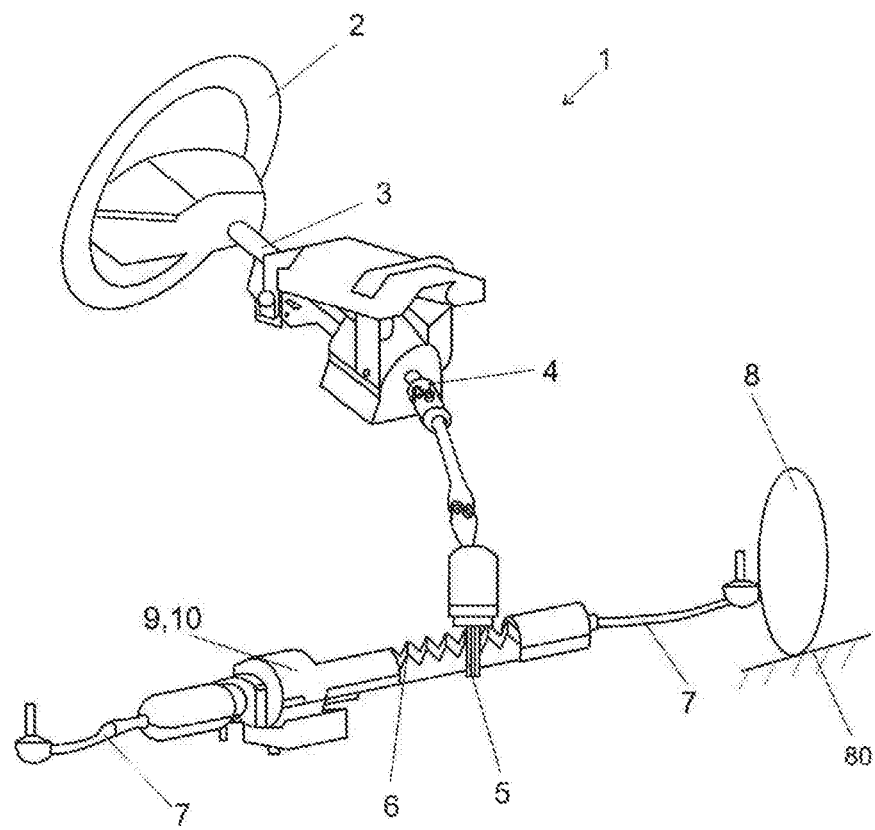
FIG. 1 is a schematic view of an example electro-mechanical motor vehicle steering device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a worm gear for a worm gear system of a motor vehicle steering device, to a worm gear system for a motor vehicle steering device, as well as to a method for producing a worm gear for a worm gear system of a motor vehicle steering device.

Accordingly, a worm gear for a worm gear system of a motor vehicle steering device, comprising a hub, a support element, and a gear rim is provided, wherein the support element is a support ring which by means of an injection-molding method is injected between the gear rim and the hub and which connects in a form-fitting manner the hub and the gear rim. The gear rim and the support element configure a multiplicity of teeth, wherein the support element has support webs which penetrate the gear rim such that the radially outward pointing end sides of the support webs are exposed. The term "exposed" here is to be understood that the end sides are not covered by the gear rim, or that the gear rim does not protrude beyond said end sides, respectively. The support webs distribute the force which in the event of stress acts on the toothing. A transmission of higher torque is enabled on account thereof.

The height of the support webs of the support element advantageously corresponds to the height of the teeth of the gear rim.

The gear rim preferably has tooth elements which configure the tooth flanks of the teeth. It is preferable herein for one tooth element to configure in each case one tooth flank of two neighboring teeth. In this case it is advantageous for the support webs of the support element to be in each case disposed between two flanks of one tooth. The support webs thus lie between two tooth elements. One tooth of the worm gear is thus formed by two tooth elements and one support web. The force acting on the toothing herein is absorbed not only by the support web but also by the two tooth elements adjacent to said support web. One tooth element preferably configures in each case one tooth flank of two neighboring teeth.

In one preferred embodiment, the support webs extend across the entire width of the worm gear in the region of the teeth. The force can thus be distributed in the best possible manner. Instead of a support web which penetrates the complete width, it is furthermore conceivable and possible for a support web which does not have the complete width of the tooth to be formed. It is furthermore possible for two support web arms to penetrate in each case part of the tooth width and for said two support webs to be in each case mutually spaced apart by a gap.

The support webs preferably have a consistent width. In one further advantageous embodiment, the support webs have a profile or undercuts, this leading to greater stresses.

The support webs from an annular web of the support element preferably extend outward in the radial direction.

The gear rim is preferably a single-component plastics-material part which is preferably formed from a tough material. In contrast, the support ring is preferably formed from a high-density, highly-oriented plastics material. The gear rim and/or the support ring are/is preferably composed of artificial resin or a thermoplastic material, in particular of polyamide, polyoxymethylene, saturated polyester, polyether, and/or ether ketone, or comprises reinforcement fibers or a fiber-reinforced plastics material.

The insert part preferably has injection bores which are configured for injecting a plastics material for configuring the support ring.

The support ring preferably has undercuts which in the production permit jamming between the support ring and the gear rim.

Furthermore provided is a worm gear system for a motor vehicle steering device, having a worm gear as described above and having a worm which engages with the worm gear.

Moreover provided is a method for producing a worm gear for a worm gear system of a motor vehicle steering device, comprising a hub, a support element, and a gear rim, said method comprising the following steps:
  providing the hub in the form of an insert part;
  inserting the insert part into the gear rim;
  injecting a plastics material between the gear rim and the insert part by means of an injection-molding method so as to configure the support element specifically in such a manner that the support element in the form of a support ring connects in a form-fitting manner the hub and the gear rim, wherein the gear rim and the support element configure a multiplicity of teeth and the support element has support webs which penetrate the gear rim such that the radially outward pointing end sides of the support webs are exposed.

The gear rim is preferably configured in such a manner that the support ring in the cured state has undercuts which in the production permit jamming between the support ring and the gear rim.

The gear rim preferably has tooth elements which configure the tooth flanks of the teeth. It is preferable herein for one tooth element to configure in each case one tooth flank of two neighboring teeth. In this case it is advantageous for the support webs of the support element to be in each case disposed between two flanks of one tooth. The support webs thus lie between two tooth elements. The force acting on the toothing herein is absorbed not only by the support web but also by the two tooth elements adjacent to said support web.

In one preferred embodiment the support webs extend across the entire width of the worm gear in the region of the teeth, that is to say that the support webs in the direction of the longitudinal axis of the worm gear have the same width as the tooth flanks, or tooth elements, respectively. The force can thus be distributed in the best possible manner.

The support webs preferably have a consistent width.

An electro-mechanical motor vehicle steering device 1 having a steering wheel 2 which is coupled in a rotationally fixed manner to an upper steering shaft 3 and to a lower steering shaft 4 is schematically illustrated in FIG. 1. The upper steering shaft 3 is functionally connected to the lower steering shaft 4 by way of a torsion bar 110. The upper steering shaft 3 is connected in a rotationally fixed manner directly to the steering wheel. The lower steering shaft 4 along the worm gear longitudinal axis 121 thereof for engaging in a form-fitting manner with an articulated assembly has a partial toothing, said articulated assembly in turn being connected to a steering gear system by way of a shaft. The lower steering shaft 4 is connected in a rotationally fixed manner to a pinion 5. The pinion 5 in a known manner meshes with a tooth segment of a rack 6. The rack 6 is mounted in a steering housing so as to be displaceable in the direction of the longitudinal axis of said rack 6. The rack 6 at the free end thereof by way of ball joints (not illustrated) is connected to tie rods 7. The tie rods 7 per se in a manner known by way of steering knuckles are in each case connected to one steered wheel 8 of the motor vehicle. A rotation of the steering wheel 2, by way of the connection of the steering shaft 3, 4 and of the pinion 5, leads to a longitudinal displacement of the rack 6 and thus to pivoting of the steered wheels 8. The steered wheels 8 by way of a carriageway 80 are imparted a feedback effect which acts counter to the steering movement. A force which requires a corresponding torque at the steering wheel 2 is consequently required for pivoting the wheels 8. An electric motor 9 of a servo unit 10 is provided for assisting the driver in this steering movement. The servo unit 10 herein can be disposed as a superimposed steering device on the steering column or as a power-assisted installation on the pinion 5 or on the rack 6.

Figure 2:
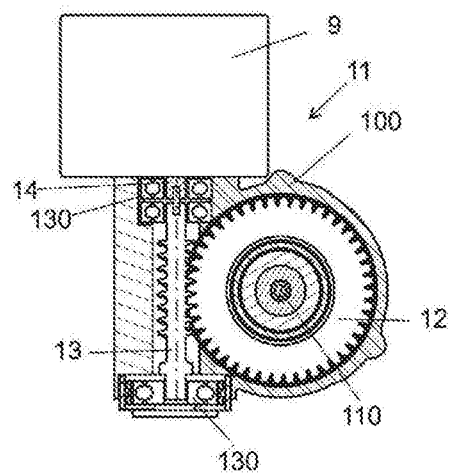
FIG. 2 is a cross-sectional view through an example worm gear system.

FIG. 2 shows a worm gear system 11 disposed in a housing 100. A worm gear 12 which is connected in a rotationally fixed manner to the steering shaft 4, for example, is provided. The worm gear 12 is driven by way of a worm 13 which in turn is driven by way of the electric motor 9, wherein the drive output 14 of the electric motor 9 for transmitting torque is correspondingly coupled to the worm 13. The worm 13 at both ends thereof is radially supported in the housing 100 by way of a roller bearing 130 and enables angular compensation.

Figure 3:
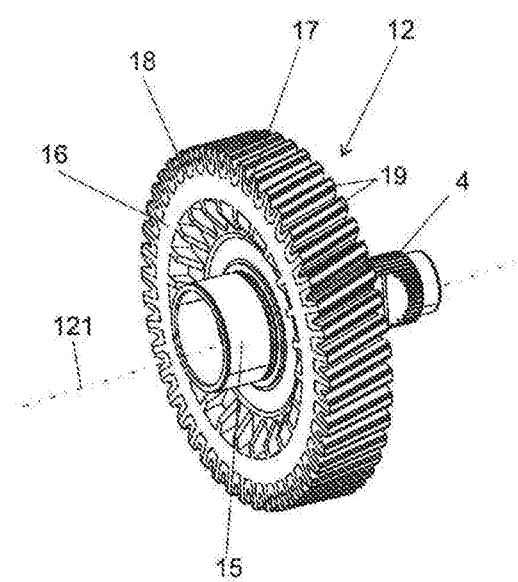
FIG. 3 is a spatial view of an example worm gear.
Figure 9:
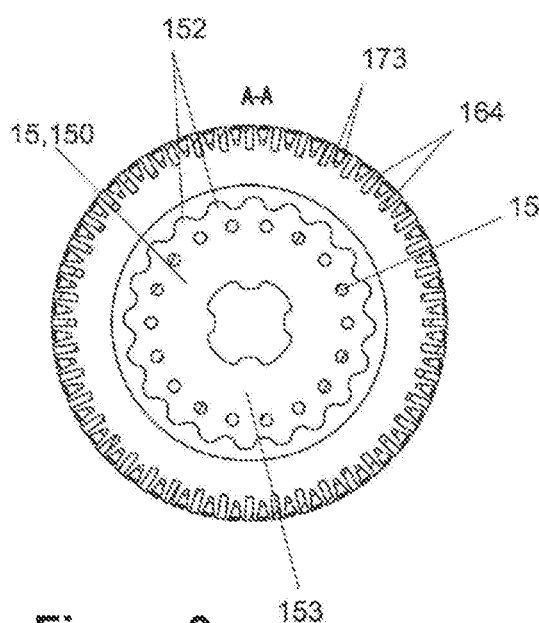
FIG. 9 is a cross-sectional view through the worm gear along line A-A.
Figure 10:
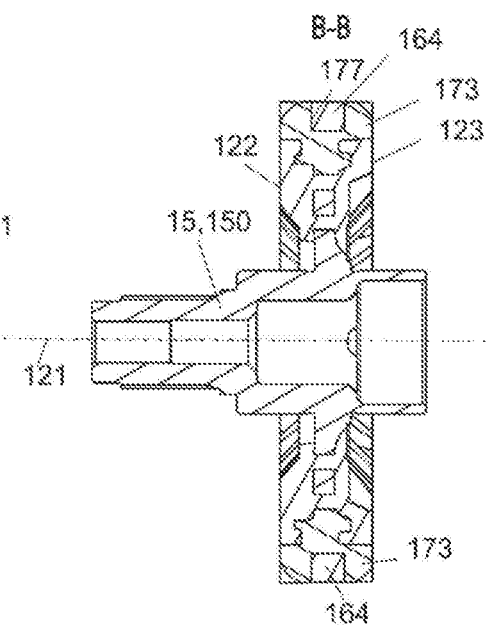
FIG. 10 is a longitudinal sectional view through the worm gear along line B-B.

The worm gear 12 having a hub 15, a support ring 16, and a gear rim 17 surrounding the support ring 16 is illustrated along the worm gear longitudinal axis 121 in FIG. 3. The hub 15 herein is configured so as to be integral to the output shaft 4 and at the one end of said hub 15 has a toothing for the form-fitting connection to the articulated assembly and at the other side is open in the direction towards the input shaft 3 such that the torsion bar 110 can be introduced thereinto. The torsion bar 110 can also be introduced into the output shaft 4 by way of the end on which the articulated assembly is provided. As is illustrated in FIG. 9, the output shaft has an internal contour in the shape of a cloverleaf so as to receive therein a shaft having a corresponding external contour.

As is shown in FIGS. 4 to 7, an insert part 150 configures the hub 15. The insert part 15 is preferably made from metal, in particular steel. The insert part 150 has a gear rim 153 having a toothing 152 which is directed radially outward in terms of the worm gear longitudinal axis 121. One injection bore 151 is in each case provided herein between two protrusions or teeth 152 of the gear rim 153. According to this embodiment, the ratio between the protrusions 152 of the gear rim 153 and the injection bores 151 of the plastics-material gear rim 17 corresponds to a ratio of 1:2. In other words: One injection bore 151 is in each case provided between every other depression which is formed between two gear rim teeth 152. The gear rim 17 is a single-component plastics material part. The gear rim 17 is preferably composed of a tough material which is not filled with glass fibers.

The support ring 16 connects the insert part 15 to the gear rim 17. The support ring 16 on both end sides 122, 123 has reinforcement ribs 161 which from an annular web 162 extend radially in the direction of a fastening region 163 having the insert part 15. The reinforcement ribs have a consistent width a. The reinforcement ribs 161 protrude laterally from the main body of the support ring 16 but do not protrude beyond the width b of the worm gear in the region of the toothing 18. A contour having protrusions and depressions in which the melt dwells during the injection-molding and fills the support ring 16 such that a defined fiber orientation can be enabled may be provided in the direction of the teeth 18 along the annular web 162, so as to be opposite the reinforcement ribs. Proceeding from the annular web 162, the support ring 16 has radially outwardly extending support webs 164 which form in each case a part of a tooth 18 of the worm gear 12. The support webs 164 have a substantially consistent wall thickness d. The mutually opposite internal sides 165 of the support webs 164 lie against a corresponding counter piece of the gear rim 17. The radially outwardly pointing end sides 166 of the support webs 164 herein are not covered by the gear rim 17 and configure the tooth tip 19 of the teeth 18. The support ring 16 is preferably formed from a high-density, highly-oriented plastics material. Proceeding from the annular web 162 at the tooth root of the support ring 16, connection elements 167 which are axially mutually opposite and which correspond with a connection structure 171 of the gear rim 17 and form a form-fit with the latter are provided.

The gear rim 17 on the inner circumferential face thereof in the direction of the insert part 15 has a connection protrusion 178 along which a single-row or multiple-row connection structure 171 is distributed on both end sides of the gear rim 17 and along the entire circumference. As is illustrated in FIG. 4, the connection structure has a smaller width than the gear rim toothing and engages in a form-fitting manner in the connection elements 167 of the support ring. Tooth elements 172 which extend radially outward and which are preferably configured so as to be V-shaped or U-shaped having two legs 173 are adjacent to the connection structure 171 on the external side which extends across the circumference. The legs 173 in the region of the end sides 166 of the support web have radially outwardly pointing end sides 179 such that the end sides 166, 179 conjointly configure the tooth tip 19 of the teeth 18. The two legs 173 of the tooth elements 172 herein configure in each case one tooth flank 174 of two successive teeth 18. The tooth flanks 174 have the contact faces 175 of the engagement mechanism with the worm. Recesses 176 which correspond with the support webs 164 of the support ring 16 are provided in the circumferential direction between the tooth elements 172. The recesses 176 consequently have a spacing b such that the support webs 164 of the support ring can be received therein. The external sides 177 of the tooth elements 172 therefore extend substantially in the radial direction.

As is shown in FIG. 7, the longitudinal axes 181 of the tooth elements 172, or of the teeth, respectively, conjointly with the longitudinal axis 121 of the worm gear 12, enclose an angle α. The angle α is preferably in a range between 13° and 20°; the angle is particularly preferably approx 15.5°.

Figure 11:
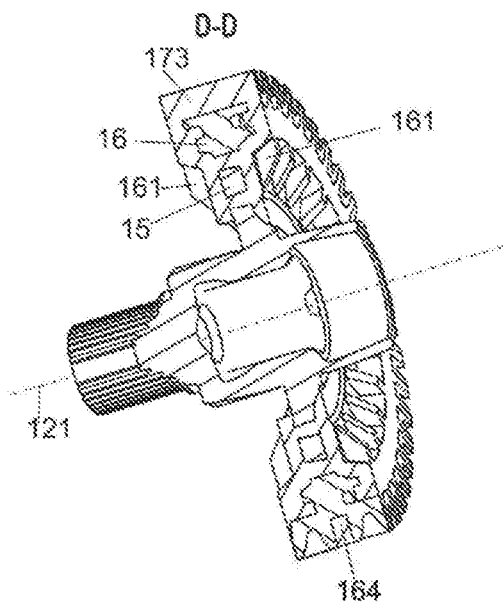
FIG. 11 is a sectional view through the worm gear along line D-D.
Figure 12:
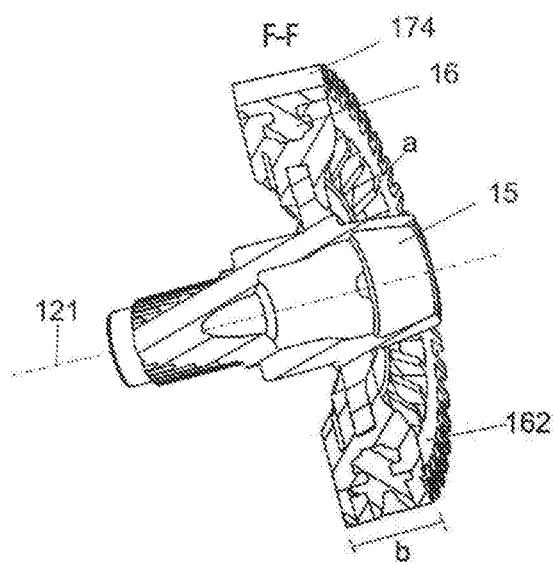
FIG. 12 is a sectional view through the worm gear along line F-F.

FIGS. 8 to 12 show the completed worm gear 12 in detail. FIG. 11 shows a section through a tooth flank of the tooth element of the gear wheel 17 of the worm gear. A section through the worm gear in the region between the tooth flanks of two successive teeth is illustrated in FIG. 12.

The gear rim 17 is preferably made by diaphragm gating. Flow marks or binding marks can thus be avoided. In a second production step, the gear rim 17 is positioned on the insert part 150. The support ring 16 in an injection-molding method is injected between the insert part 150 and the gear rim 17. To this end, the insert part 150 has injection bores 151 into which a plastics material for configuring the support ring 16 is injected. The gaps, or recesses, respectively, 176 present between the tooth elements 173 are closed on account of the injection of the support ring 16. The support ring 16 thus reaches up to the toothing of the worm gear. The support webs 164 formed on account thereof extend continuously across the entire width b of the worm gear 12, from one end side 122 of the worm gear 12 to the other end side 123. The component is thus imparted a very high rigidity. The support ring 16 formed by injection-molding enables a form-fit between the gear rim 17 and the insert part 150. Said support ring 16 is a highly rigid load-bearing structure which can be economically produced. A worm gear 12 having positive contact properties when engaging with the worm and a positive support structure is achieved on account of the choice of different materials for the support ring 17 and the gear wheel 16.

What is claimed is:

1. A worm gear for a worm gear system of a motor vehicle steering device, the worm gear comprising:
   a hub;
   a gear rim; and
   a support element configured as a support ring that is injection molded between the gear rim and the hub so as to connect the gear rim and the hub in a form-fitting manner, wherein the gear rim and the support element configure teeth, wherein the support element has support webs that penetrate the gear rim such that radially outward pointing end sides of the support webs are exposed, wherein the support webs extend across an entire width of the worm gear in a region of the teeth.

2. The worm gear of claim 1 wherein the gear rim includes tooth elements configured as tooth flanks of the teeth.

3. The worm gear of claim 2 wherein in each case one of the tooth elements is configured as one of the tooth flanks of two neighboring teeth of the teeth.

4. The worm gear of claim 1 wherein the support webs have a constant width.

5. The worm gear of claim 1 wherein the support webs extend in a radially outward direction from an annular web of the support element.

6. The worm gear of claim 1 wherein the gear rim is a single-component plastics material part.

7. The worm gear of claim 1 wherein the hub is configured as an insert part that has injection bores that are configured for injecting plastic for configuring the support ring.

8. A method for producing a worm gear for a worm gear system of a motor vehicle steering device, the method comprising:

providing a hub of the worm gear, the hub being configured as an insert part;

inserting the insert part into a gear rim of the worm gear; and injecting plastic between the gear rim and the insert part by way of injection molding to configure a support element of the worm gear as a support ring that connects in a form-fitting manner the hub and the gear rim, wherein the gear rim and the support element configure teeth, wherein the support element includes support webs that penetrate the gear rim such that radially outward pointing end sides of the support webs are exposed, wherein the gear rim has tooth elements that configure tooth flanks of the teeth, wherein the support webs are in each case disposed between two of the tooth flanks of one of the teeth.

9. The method of claim 8 wherein in each case one of the tooth elements is configured as one of the tooth flanks of two neighboring teeth of the teeth.

10. The method of claim 8 wherein the support webs extend across an entire width of the worm gear in a region of the teeth.

11. The method of claim 8 wherein the support webs have a constant width.

12. A worm gear for a worm gear system of a motor vehicle steering device, the worm gear comprising:

a hub;

a gear rim; and a support element configured as a support ring that is injection molded between the gear rim and the hub so as to connect the gear rim and the hub in a form-fitting manner, wherein the gear rim and the support element configure teeth, wherein the support element has support webs that penetrate the gear rim such that radially outward pointing end sides of the support webs are exposed, wherein the gear rim includes tooth elements configured as tooth flanks of the teeth, wherein in each case one of the tooth elements is configured as one of the tooth flanks of two neighboring teeth of the teeth, wherein the support webs are in each case disposed between two of the tooth flanks of one of the teeth.

13. The worm gear of claim 12 wherein the support webs extend across an entire width of the worm gear in a region of the teeth.

14. The worm gear of claim 12 wherein the support webs have a constant width.

15. The worm gear of claim 12 wherein the support webs extend in a radially outward direction from an annular web of the support element.

16. The worm gear of claim 12 wherein the gear rim is a single-component plastics material part.

17. The worm gear of claim 12 wherein the hub is configured as an insert part that has injection bores that are configured for injecting plastic for configuring the support ring.

* * * * *